Oct. 23, 1923.                                                1,471,815
                       W. S. ARLESKIE
                         AIR BRAKE
             Filed March 28, 1923      2 Sheets-Sheet 1
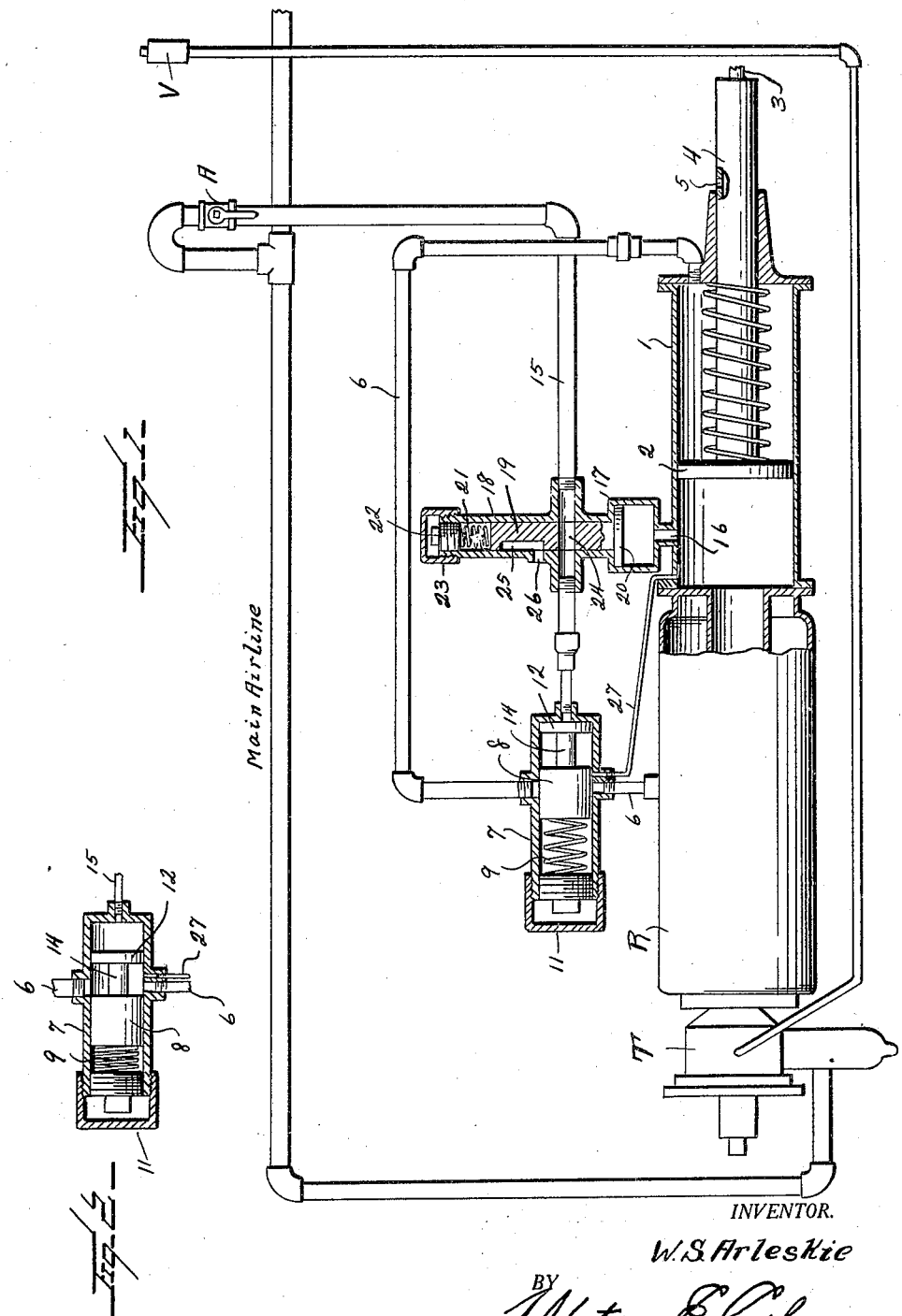
INVENTOR.
W. S. Arleskie
BY Watson E. Coleman
ATTORNEY.

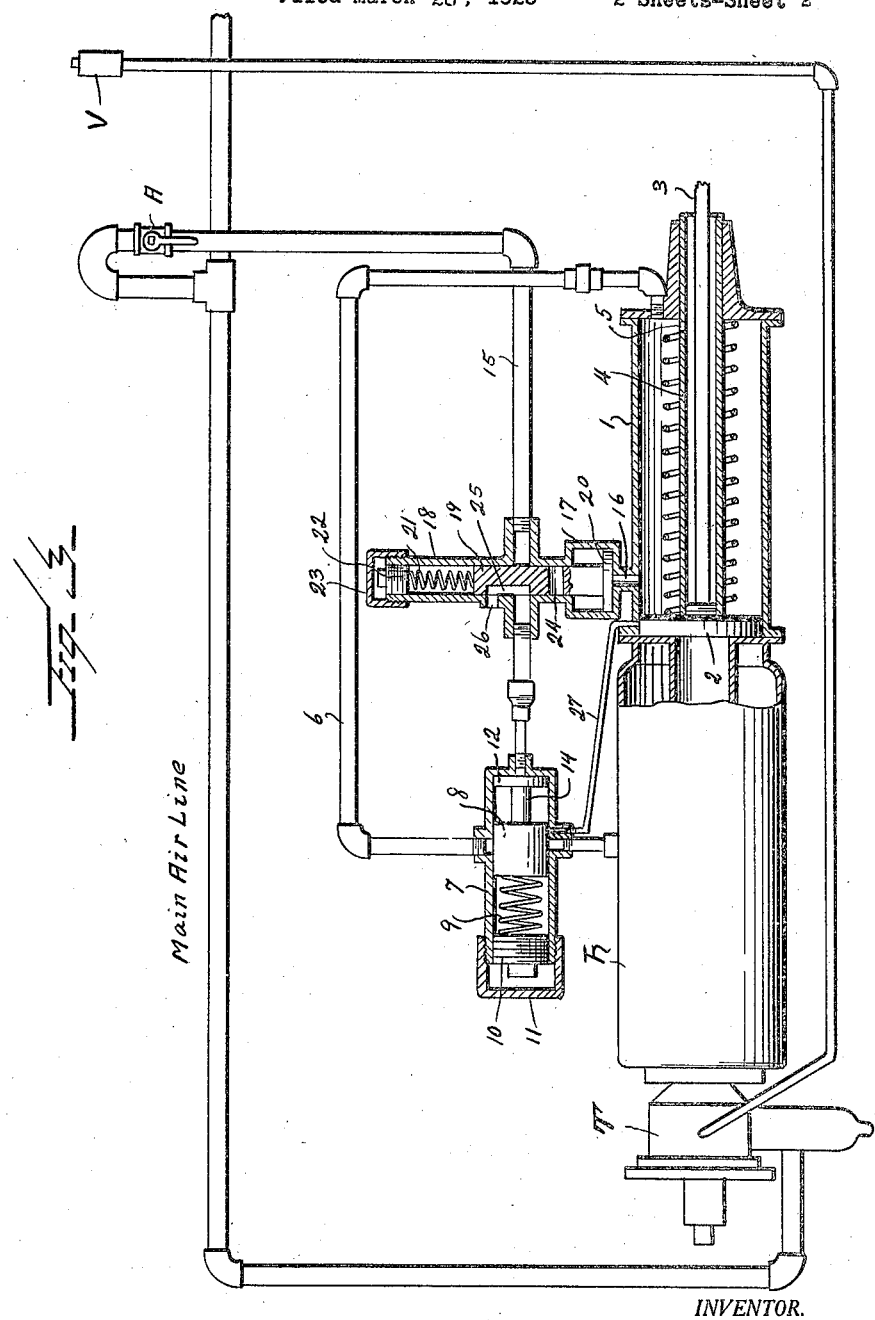

Patented Oct. 23, 1923.

1,471,815

UNITED STATES PATENT OFFICE.

WILLIAM S. ARLESKIE, OF PITTSTON, PENNSYLVANIA.

AIR BRAKE.

Application filed March 28, 1923. Serial No. 628,297.

*To all whom it may concern:*

Be it known that I, WILLIAM S. ARLESKIE, a citizen of the United States, residing at Pittston, in the county of Luzerne and State of Pennsylvania, have invented certain new and useful Improvements in Air Brakes, of which the following is a specification, reference being had to the accompanying drawings.

This invention relates to certain improvements in air brakes and it is an object of the invention to provide novel and improved means whereby sticking of the brake is avoided and also wherein sticking of the triple valve does not prevent release.

It is also an object of the invention to provide an air brake with novel and improved means whereby the action of the spring within the brake cylinder upon release is supplemented by air pressure whereby sticking of the piston or hand brake is prevented and wherein the flow of such pressure is under automatic control.

The invention consists in the details of construction and in the combination and arrangement of the several parts of my improved air brake whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view partly in section and partly in elevation and of a diagrammatic character illustrating an air brake constructed in accordance with an embodiment of my invention;

Figure 2 is a fragmentary detailed view partly in section and partly in elevation of the pressure valve as herein comprised and in a second position; and Figure 3 is a view similar to Figure 1 showing the position of the parts when the brake is in full release.

As disclosed in the accompanying drawings, 1 denotes a brake cylinder of the type now generally employed in connection with air brake systems and in which is mounted for rectilinear movement the piston 2. Associated with the piston 2 is the brake rod 3, said rod 3 being directed through a tubular member 4, said member 4 being movable with the piston 2 and rod 3. The outer end portion of the member 4 is open for communication with the atmosphere and a wall of said member 4 at a predetermined point is provided with a port 5 which, when the piston 2 is in full release position, as illustrated in Figure 3, is in communication with the interior of the brake cylinder 1 so that the pressure within said cylinder may escape to the atmosphere.

Associated with the brake cylinder 1 in a conventional manner is a reservoir R and the triple valve T, said triple valve having in communication therewith the main air line. Leading from the reservoir R is a pipe line 6 which is in communication with the brake cylinder 1 and preferably through the outer head thereof.

Interposed within the pipe line 6 is a casing 7 for the pressure valve 8, said valve through the instrumentality of the expansible member or spring 9 normally maintaining the valve 8 in a position to close the flow through the pipe 6.

As herein disclosed the spring 9 is interposed between the valve 8 and a plug 10 threaded within the outer end portion of the casing 7, said plug being preferably protected or housed by the cap 11. The plug 10 provides means whereby the tension of the spring 9 may be adjusted, as an example to seventy pounds or ninety pounds as is determined by the particular freight or passenger service.

Arranged within the casing 7 is the piston 12 connected to the valve 8 by the rod or stem 14. In communication with the casing 7 through the head thereof immediately adjacent to the piston 12 is a pipe line 15 leading from the main air line and when said line 15 is open the pressure from the main line when effecting a brake release will cause the valve 8 to move in open position as particularly illustrated in Figure 2, so that the pressure within the reservoir R will be conveyed through the pipe line 6 into the outer end portion of the brake cylinder 1 whereby the movement of the piston 2 into full release is assured and thereby eliminating the possibility of the brake sticking as so often occurs with the air brake equipments now generally in use.

In communication, as at 16 with the inner end portion of the cylinder 1 is a cylinder 17 arranged at an extended portion of a valve casing 18. Mounted for reciprocatory movement within the casing 18 is a valve member 19, said member 19 being provided at one end portion with a piston 20 working within the cylinder 17. The valve member 19 normally closes flow through the pipe line 15 and is maintained in such position by the expansible member or spring 21 interposed between an end of the valve 19 and a plug 22 maintained in the outer end portion of the casing 18, said plug 22 providing means whereby the tension of the spring 21 can be adjusted or regulated in accordance with the service. The plug 22 is also herein disclosed as protected and housed by a cap 23.

Upon application, the piston 2 moves outwardly and when said piston 2 reaches a position beyond the communication 16 the pressure will force the piston 20 upwardly or outwardly and thereby move the valve 19 into position to bring the port 24 disposed therethrough into registry with the pipe line 15 whereby said line 15 is opened. The pressure in the pipe line 15 however at this time is insufficient to move the valve 8 into open position but when the engineer's valve is brought into running position and the pressure in the main line reaches either seventy pounds or ninety pounds, depending upon the service, the valve 8 will move into open position and the pressure in the reservoir R will then pass through the pipe line 6 into the outer end portion of the brake cylinder 1 so that upon release, it will be assured that there will be no sticking of the brake. Upon full release, the valve 8 under the influence of the spring 9 will return to closed position and the valve 19 under action of the spring 21 will also return to its normal or closed position. When in closed position the valve 19 is provided with a by-pass 25 which communicates with the portion of the line 15 between the casings 7 and 18 and with the port 26 in a wall of the casing 18, said port 26 being in communication with the atmosphere. By this the return of the valve 8 into closed position is facilitated as the air will be readily exhausted.

It sometimes occurs that the triple valve T does not function properly and especially upon release and thereby obstructing the desired exhaust of the pressure within the brake cylinder 1 inwardly of the piston 2. I therefore provide a bleeder line 27 leading from and in communication with the inner end portion of the brake cylinder 1 and in communication with the casing 7. The flow through the bleeder line 27 is also closed by the valve 8 when in its normal or closed position but when the valve 8 has moved into open position as in Figure 2, the pressure within the inner end portion of the brake cylinder 1, with the effect of releasing pressure on the rear of the brake piston 2 when the same is operated and which is particularly desirable when the triple valve sticks. Upon full release, the piston 2 also closes the bleeder line 27 as is clearly illustrated in Figure 3.

V denotes a retaining valve of a conventional type which is in requisite communication with the triple valve T. Upon travelling down a steep grade it is required that the retaining valve V be closed and in my improved device it also desired under such conditions, that the flow through the pipe line 15 be closed and preferably in advance of the valve member. For this reason I interpose in the pipe line 15 and preferably at a point in relatively close proximity to the valve V the valve A of any preferred type or construction. The reason for positioning the valve A adjacent the valve V is for convenience of adjustment by a trainman.

The bleeder line 27 also functions to relieve the pressure within the cylinder 1 inwardly of the piston 2 in the event that the retaining valve V becomes clogged or for other cause fails to function properly.

While I herein disclose the retaining valve V of a type now generally employed, it is to be understood that a brake constructed in accordance with my invention can operate with facility without the use of such retaining valve V and more particularly in connection with freight service.

From the foregoing description it is thought to be obvious that an air brake constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. In an air brake system, a main line communicating with a brake cylinder, a reservoir, a pipe line leading from the reservoir and communicating with the brake cylinder outwardly of the piston, a valve normally closing the flow through said second pipe line, said valve moving into open position in response to releasing pressure in the main line.

2. In an air brake system, a main line communicating with a brake cylinder, a reservoir, a pipe line leading from the reservoir and communicating with the brake cylinder outwardly of the piston, a valve normally closing the flow through said second pipe line, said valve moving into open position in response to releasing pressure in the main line, and a bleeder pipe line in communication with the inner end portion of the brake cylinder and with the second named line, the valve interposed in the second named line also normally closing flow through the bleeder line.

3. In an air brake system, a main line communicating with a brake cylinder, a reservoir, a pipe line leading from the reservoir and communicating with the brake cylinder outwardly of the piston, a valve normally closing the flow through said second pipe line, said valve moving into open position in response to releasing pressure in the main line, and a bleeder pipe line in communication with the inner end portion of the brake cylinder and with the second named line, the piston in the brake cylinder when in full release closing flow through the bleeder line.

4. In an air brake system, a brake cylinder, a brake piston working therein, a tubular member working with the piston and extending exteriorly of the cylinder and in communication with the atmosphere, said tubular member when the piston is in release position having a port in communication with the cylinder, a main pressure line in communication with the brake cylinder, a pipe line leading from the reservoir and communicating with the brake cylinder in advance of the piston, a cylinder interposed in the second pipe line, a valve moving within said cylinder, means for normally holding the valve in a position to stop flow through the second named line, a pipe line leading from the main line to the cylinder, a valve interposed in said last named line and normally closing the flow therethrough, said valve being responsive to the pressure within the brake cylinder inwardly of the piston when the piston is in application position to open the flow through the last named line to the cylinder, the valve in the cylinder being responsive to releasing pressure in the main line.

5. In an air brake system, a brake cylinder, a brake piston working therein, a tubular member working with the piston and extending exteriorly of the cylinder and in communication with the atmosphere, said tubular member when the piston is in release position having a port in communication with the cylinder, a main pressure line in communication with the brake cylinder, a pipe line leading from the reservoir and communicating with the brake cylinder in advance of the piston, a cylinder interposed in the second pipe line, a valve moving within said cylinder, means for normally holding the valve in a position to stop flow through the second named line, a pipe line leading from the main line to the cylinder, a valve interposed in said last named line and normally closing the flow therethrough, said valve being responsive to the pressure within the brake cylinder inwardly of the piston when the piston is in application position to open the flow through the last named line to the cylinder, the valve in the cylinder being responsive to releasing pressure in the main line; and a bleeder line leading from the inner portion of the brake cylinder to the cylinder interposed in the second named line, the valve in the cylinder interposed in said second named line also normally closing flow through the bleeder line.

6. In an air brake system, a brake cylinder, a brake piston working therein, a tubular member working with the piston and extending exteriorly of the cylinder and in communication with the atmosphere, said tubular member when the piston is in release position having a port in communication with the cylinder, a main pressure line in communication with the brake cylinder, a pipe line leading from the reservoir and communicating with the brake cylinder in advance of the piston, a cylinder interposed in the second pipe line, a valve moving within said cylinder, means for normally holding the valve in a position to stop flow through the second named line, a pipe line leading from the main line to the cylinder, a valve interposed in said last named line and normally closing the flow therethrough, said valve being responsive to the pressure within the brake cylinder inwardly of the piston when the piston is in application position to open the flow through the last named line to the cylinder, the valve in the cylinder being responsive to releasing pressure in the main line, said last named valve being provided with a port affording communication with the portion of the last named pipe line between the second named valve and the second named cylinder and the atmosphere when said last named valve is in its normal or closed position.

7. In an air brake system, a brake cylinder, a brake piston working therein, a main line communicating with the brake cylinder, a triple valve for the main line, and automatic means independently of the triple valve for reducing the pressure in advance of the piston when said piston is moving into release position.

In testimony whereof I hereunto affix my signature.

WILLIAM S. ARLESKIE.